United States Patent [19]

Toaz et al.

[11] Patent Number: 4,587,177
[45] Date of Patent: May 6, 1986

[54] CAST METAL COMPOSITE ARTICLE

[75] Inventors: Milton E. Toaz, Bedford; Martin D. Smalc, Parma, both of Ohio

[73] Assignee: Imperial Clevite Inc., Glenview, Ill.

[21] Appl. No.: 719,938

[22] Filed: Apr. 4, 1985

[51] Int. Cl.⁴ .................... B22D 25/00; B22D 19/02
[52] U.S. Cl. .................................. 428/614; 428/610
[58] Field of Search ............................... 428/614, 610

[56] References Cited

U.S. PATENT DOCUMENTS

| 4,075,364 | 2/1978 | Panzera | 428/610 |
| 4,404,262 | 9/1983 | Watmough | 428/539.5 |
| 4,450,207 | 5/1984 | Donomofo et al. | 428/614 |
| 4,465,741 | 8/1984 | Yamatsuta et al. | 428/614 |

FOREIGN PATENT DOCUMENTS

| 075844 | 4/1983 | European Pat. Off. |
| 080562 | 6/1983 | European Pat. Off. |
| 1567328 | 5/1980 | United Kingdom |
| 159280 | 8/1981 | United Kingdom |
| 2033805 | 7/1982 | United Kingdom |

OTHER PUBLICATIONS

SAE Technical Paper Series 830252—"Ceramic Fiber Rinforced Piston for High Performance Diesel Engines" dated Feb. 28–Mar. 4, 1983.
SAE Technical Paper Series 830067—"Fuel Economy-Its Influence on Diesel Piston Design Features" dated Feb. 28–Mar. 4, 1983.

Primary Examiner—Veronica O'Keefe
Attorney, Agent, or Firm—Russell E. Baumann

[57] ABSTRACT

A metal article such as a piston for a diesel engine has at least one portion which includes a matrix composite reinforced by inorganic ceramic fibers, wherein the density of fibers and/or the fiber orientation in the matrix composite is varied to provide superior resistance to thermal fatigue while having superior strength and wear characteristics.

7 Claims, 9 Drawing Figures

CAST METAL COMPOSITE ARTICLE

BACKGROUND AND SUMMARY OF INVENTION

This invention relates to a metal article such as an engine piston and method of making same and inserts incorporated therein, and more particularly relates to an article such as an engine piston of which at least a part is a metal matrix composite reinforced by inorganic fibers.

In an internal combustion engine, and more particularly diesel engines, the pistons are generally subjected to very severe operational conditions, and as a result, the provision of a strong constitution, therefore, is very important. In particular, three design characteristics that are very important for an engine piston are: (1) resistance to wear; (2) resistance to burning or seizure, and (3) resistance to thermal fatigue (thermally induced cracking). The areas of the piston which are subjected to the most extreme conditions (high temperature and high pressure), and therefore need maximized design material characteristics, are the upper and lower wall surfaces of the top ring-receiving groove and the top combustion bowl in the crown of the piston.

Accordingly, in the prior art it has been widely practiced, in the case of diesel engines, for the part of the piston from which the top piston ring groove is formed to include a reinforcing insert formed of special cast iron such as NiResist cast iron which has more wear resistant and thermal fatigue properties than the matrix material from which the piston is mainly constructed (e.g., aluminum or aluminum alloy). However, such pistons cast with wear-resistant ring carriers, such as NiResist cast iron, suffer from certain problems such as lower thermal conductivity, poor adhesion of the insert to the piston body and expense of producing and incorporating the insert in the piston. With regard to the combustion bowl area, attempts have been made to reduce the propensity for thermal cracking by modifying the piston matrix alloy and changing the geometry of the combustion bowl itself, but these changes have proven only marginally successful. In some cases, the changes in geometry of the bowl have even reduced efficiency of combustion in the engine.

One further solution has been to provide reinforcing ceramic fibers in the metal matrix of the piston often with the further addition of a surface coating layer of a ceramic. These fibers and surface layers are added to the area of the piston where high temperature and/or anti-wear characteristics are needed, such as in the combustion bowl region and ring area of the piston. The incorporation of the reinforcing fibers in the piston, however, has been difficult to achieve in standard casting practice without the employment of difficult and costly alloying additions, which may lead to reliability problems in operation. Additionally, when the fiber volume fractions needed to gain desired properties of the composite material are high, then severe thermal cracking can occur, especially if solution heat treating of the piston is tried to maximize strength.

Accordingly, it is a principal object of the instant invention to provide a fiber reinforced metal article and method of making same, which is produced with a preformed ceramic fiber insert that will provide good wear resistance, increased elevated temperature strength and desired heat transfer to the article without an additional surface layer, thus being reliable in operation and economical to produce.

SUMMARY OF INVENTION

According to one aspect, the present invention provides a composite metal article comprising a body of a metal material and a preform insert member of ceramic fiber material in said body for increasing resistance to thermal fatigue and improving wear characteristics and yield strength of the article, the preform insert member being of ceramic fiber material and having preselected characteristics for achieving a highly reliable bond between the body of the article and the preform insert member.

According to another aspect, the present invention provides a piston for an internal combustion engine comprising a body of aluminum or aluminum alloy and a preform insert member of ceramic fiber material in said body for increasing resistance to thermal fatigue and improving wear characteristics and yield strength of the piston, the preform insert member being of ceramic fiber material and having preselected characteristics for achieving a highly reliable bond between the body of the article and the preform insert member.

According to still another aspect, the present invention provides a piston for an internal combustion engine comprising a body of aluminum or aluminum alloy and a preform insert member of ceramic fiber material in said body for increasing resistance to thermal fatigue and improving wear characteristics and yield strength in said piston, said preform insert member having more than one portion of ceramic fibers with at least one of said portions differing in characteristics from the other portions.

According to still another aspect, the present invention provides a composite piston comprising a body of aluminum or aluminum alloy and a preform insert member of ceramic fiber material in said body for increasing the wear characteristics and yield strength of the piston, the body having a first portion of aluminum or aluminum alloy and a second composite portion containing said insert member, the preform insert member having a lower density portion of ceramic fibers in its outer surface areas directly adjacent said first body portion and a higher density portion of ceramic fibers at said functional surface apart from said first body portion for achieving minimal thermal cracking and a highly reliable bond of said insert member in said piston.

According to still another aspect, the present invention provides a composite piston comprising a body of aluminum or aluminum alloy and a preform insert member of ceramic fiber material in said body for increasing the wear characteristics and yield strength of the piston, the body having a first portion of aluminum or aluminum alloy and a second composite portion containing said insert member, the preform insert member having a first orientation of ceramic fibers at its outer surface directly adjacent to said first body portion and a second orientation of ceramic fibers at said functional surface apart from said first body portion, the first orientation of said fibers being chosen for a highly reliable bond whereas the second orientation of fibers is chosen for optimum thermal fatigue characteristics.

According to yet another aspect, the present invention provides a method of manufacture of a ceramic fiber reinforced piston having a loadbearing and wear-resistant portion of ceramic fibers in a body of aluminum or aluminum alloy comprising the steps of providing a preform insert member of ceramic fibers of preselected characteristics, placing said member in a mold and squeeze casting aluminum around and through it so as to produce a ceramic fiber reinforced piston, cooling said piston, and solution heat treating with quenching and aging to obtain maximum yield strength for the matrix metal.

According to yet still another aspect, the present invention provides a preform of ceramic fiber material adapted for use in a metal article having more than one portion of ceramic fibers with at least one of said portions differing in characteristics from the other portions.

According to yet another apsect, the present invention provides a preform of ceramic fiber material adapted for use in a metal article having more than one portion of ceramic fibers with at least one of said portions being constructed with a first predetermined ceramic fiber orientation at one outer surface and a second ceramic fiber orientation in the functional area apart from said other outer surface.

One benefit obtained from the present invention is a ceramic fiber reinforced piston which resists cracking-/bond problems between areas of the piston with reinforcing fibers and areas without fibers as a result of thermal cycling during engine operation or from heat treating practice, while not needing a separate surface coating for increasing resistance to thermal fatigue or resistance to wear.

Another benefit obtained from the present invention is a ceramic fiber reinforced piston which resists wear from the piston ring.

Yet another benefit obtained from the present invention is being able to produce a composite piston in which the strength of aluminum alloy can be enhanced to the maximum level obtainable from the alloy through solution heat treating, that is, a heat treatment involving a rapid quench which is detrimental to pistons produced by the prior art.

Another benefit is improved thermal conductivity in the ring belt area of the piston.

Yet still another benefit obtained from the present invention is a composite piston which is economical to produce and is reliable in operation.

Additional benefits and advantages of the present invention will become apparent upon a reading of the description of the preferred embodiments taken in conjunction with the accompanying drawings.

DESCRIPTION OF THE PREFERRED EMBODIMENT

Figure 2:
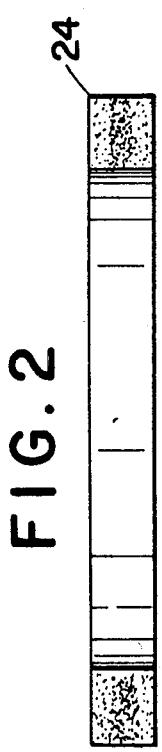
FIG. 2 shows one embodiment of a variable density preform of ceramic material in accordance with the present invention.
Figure 2A:
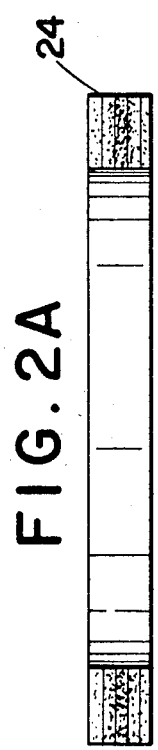
FIG. 2a shows a variation of the embodiment of FIG. 2.
Figure 3:
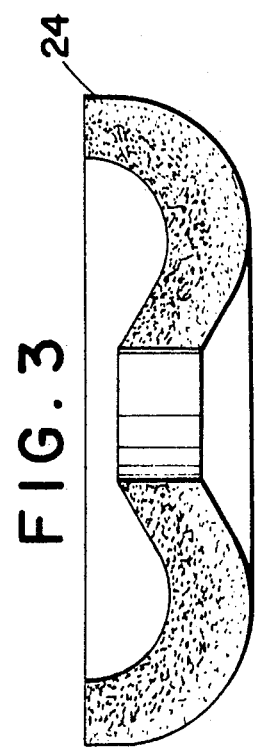
FIG. 3 shows another embodiment of a variable density preform of ceramic fiber material in accordance with the present invention.
Figure 3A:
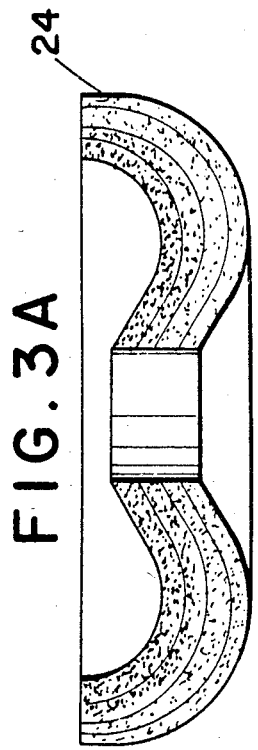
FIG. 3a shows a variation of the embodiment of FIG. 3.
Figure 1:
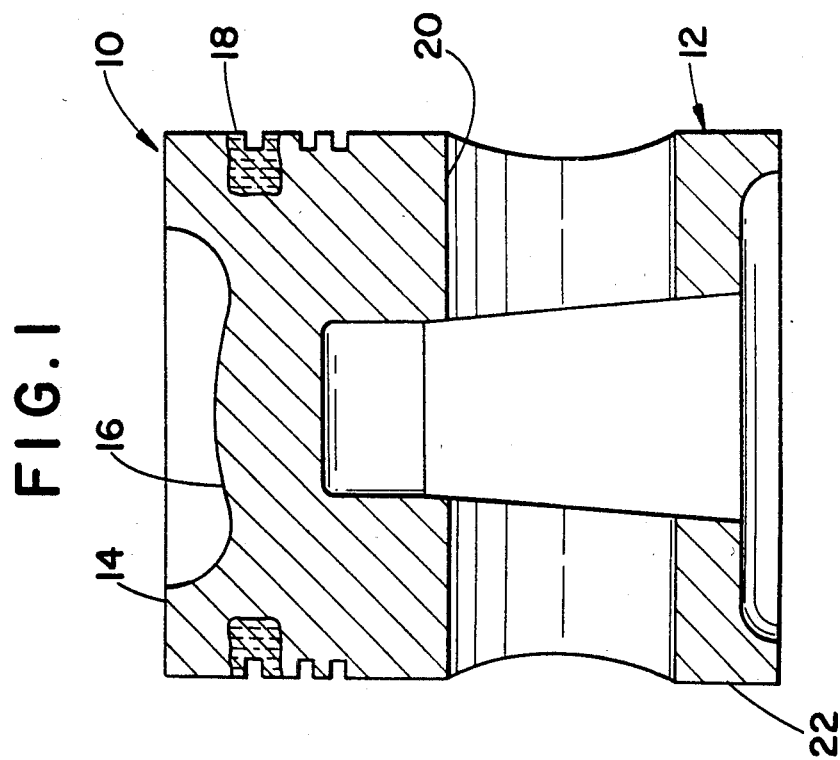
FIG. 1 shows a cross-sectional view of a piston in accordance with the present invention.

Referring to the drawings, FIG. 1 shows a piston 10 having a piston body 12 of any known or convenient shape preferably from a material such as magnesium, aluminum or an alloy thereof, for example, an alloy containing 9.5% Si, 3.0% Cu, 1.0% Mg, 1.0% Zn, 1.0% Max Fe and the balance Al (Aluminum Association 332.0).

Other examples of commonly used alloys include Aluminum Association 242.0 which has 4.0% Cu, 2.0% Ni, 1.5% Mg, 0.7% Si max, 1.0% Fe max and the balance Al, Aluminum Association 336.0, which has 12.0% Si, 2.5% Ni, 1.0% Mg, 1.0% Cu, 0.2% Fe max and the balance Al, or other casting or wrought aluminum base alloys containing no more than 3.0% Zn. Hereinafter when the term aluminum is used, it is meant to include aluminum and alloys thereof.

Piston 10 has a crown 14 including a combustion bowl area 16 at the top of the piston, a ring groove area 18 in the peripheral wall, a gudgeon pin boss 20 and a skirt 22.

In accordance with the present invention, the ring groove area 18 and/or combustion bowl area 16 include a preform 24 of ceramic fiber material, as clearly shown in FIGS. 2, 2a, 3, 3a, 4 and 4a. Preform 24 comprises ceramic inorganic fibers such as alumina, alumina/silica fibers (approximately 51% by weight $Al_2O_3$), silicon carbide fiber or others as are known in the art. These preforms can be produced by any number of methods as are known in the art, such as by vacuum forming. The characteristics, that is, density, type, and orientation of these fibers are carefully selected, as will be described in detail later, to be able to maximize strength and wear properties by heat treating (solution heat treating and/or quenching) the piston without thermal cracking problems due to the thermal compatibility problems between the portion of the piston containing the fibers (composite portion) and the portion of the piston containing only the aluminum material (matrix portion).

The preform of ceramic fibers is placed in a mold for the article, such as a piston, and aluminum is pressure cast around and through it. The casting is preferably done by the squeeze casting method which minimizes porosity in the casting, reduces dendritic cell size and substantially improves the bond between the ceramic fiber preform and the matrix aluminum material. It is to be understood that during the squeeze casting operation the aluminum matrix material totally flows through and infiltrates the porous preform to form a composite portion of the piston including matrix material and the ceramic fibers.

Figure 4:
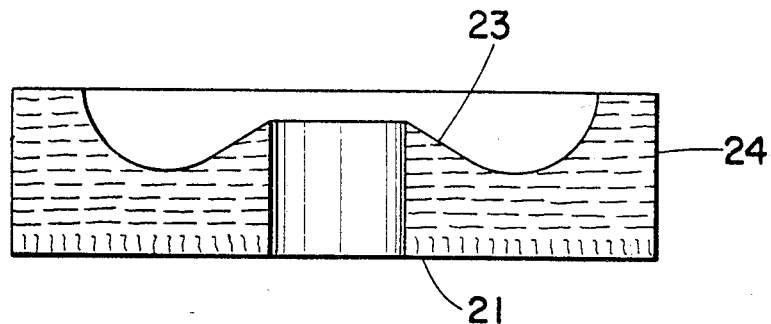
FIG. 4 shows yet another embodiment of a ceramic fiber preform with preselected varied fiber orientation in accordance with the present invention.
Figure 4A:
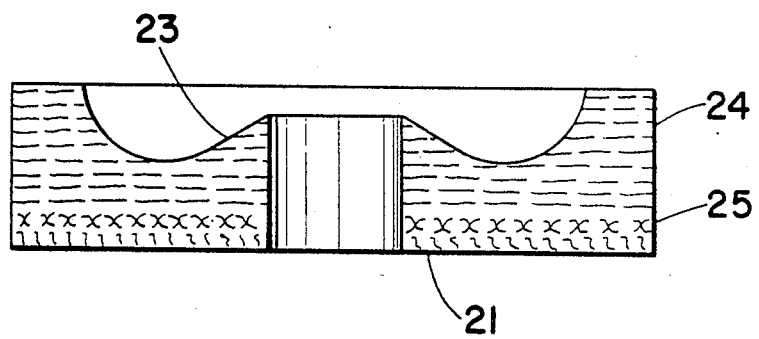
FIG. 4a shows a variation of the embodiment of FIG. 4 in which a transition zone of random fiber orientation is employed.

Further, it has been found necessary, to achieve certain desired properties, to have the ceramic fiber content at the functional surface of the final composite portion of the piston (that surface providing the wear-resistance and thermal protection) have a preferred density of 10 to 20 volume percent or more. This total density requirement (from 10 up to as much as 50 volume percent) greatly reduces the thermal expansion coefficient of the composite, which can cause problems when bonding to the matrix material. Additionally, the reduction of thermal expansion of the composite gives rise to thermal cracking problems during post-casting heat treatment such as solution heat treating and quenching which are desired to provide the best strength properties for the article. In accordance with the present invention, preform 24 has been designed with a variable fiber density (See FIGS. 2, 2a, 3 and 3a) or a varied orientation (See FIGS. 4 and 4a) from the surface in contact with the base (matrix) piston material to the functional surface(s) providing the required wear resistance or thermal fatigue protection. That is, for example, if a ceramic fiber density of 15 volume percent is required in the combustion bowl area, then the preform would be designed to have a density of fibers of about five volume percent or less at the interface between the composite portion of the preform and the base piston material and progressively increase to the 15 volume percent at the functional surface of the combustion bowl. Preferably, the density variation of the preform is gradual from the surface of maximum density to the surface of minimum density, although the use of a series of successive layers would likewise be perfectly acceptable so long as the difference in volume percent between the two layers would not vary more than five percent (See FIGS. 2a and 3a). The variable density preform distributes the stresses which develop when the piston undergoes severe changes in temperature, for example, during solution treating and quenching. Alternatively, the preform would be designed with a fiber orientation aligned with the piston axis at the interface 21 between the composite section and the base piston material whereas the orientation of ceramic fibers at the functional surface 23 would be aligned approximately parallel with the piston crown (See FIG. 4). In certain instances it may be desirable to include a transition zone 25 of randomly oriented fibers as shown in FIG. 4a. This construction further distributes the stresses resulting from rapid temperature changes such as might be encountered in heat treatment or severe engine operating conditions. Lastly, this design provides for a piston with excellent wear resistance and strength, while not necessitating the use of a separate surface coating layer.

Figure 6:
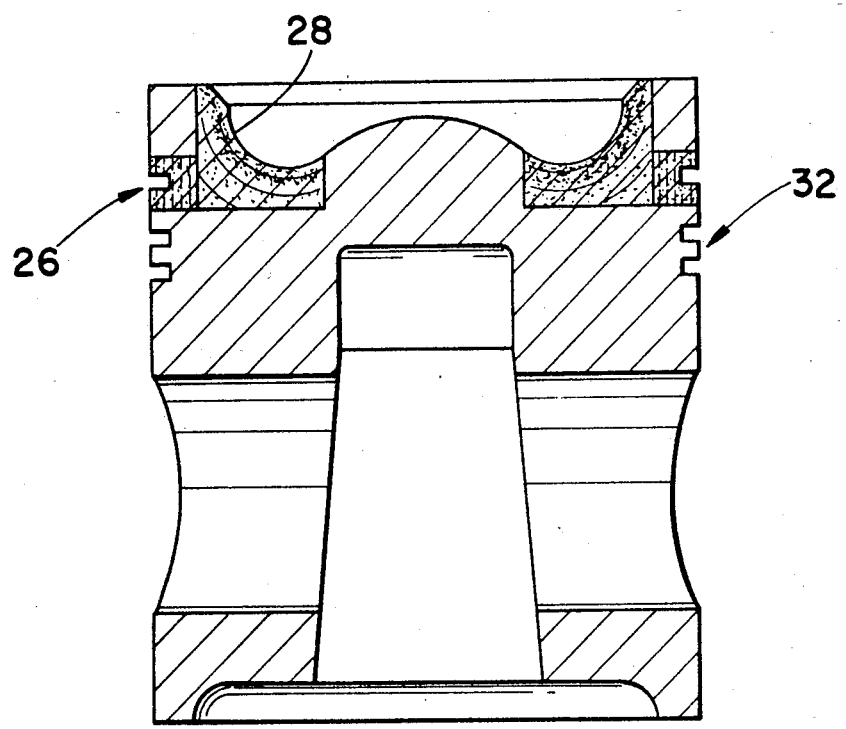
FIG. 6 shows a cross-sectional view of a piston incorporating the preform of FIG. 5.
Figure 5:
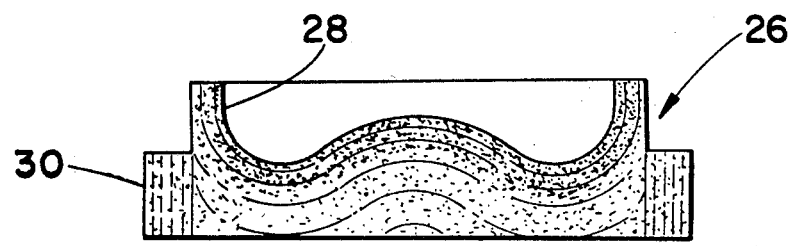
FIG. 5 shows still another embodiment in cross-section of a variable density preform of ceramic fiber material having more than one portion of ceramic fibers of a preselected varied density or predetermined orientation in accordance with the present invention.

Another embodiment of the present invention comprises a metal article, such as a piston, as shown in FIG. 6, which includes a multiple portion ceramic fiber insert member 26. This multiple portion ceramic fiber insert member is provided for ease of manufacture of the final article, while allowing for post-casting heat treatment for maximizing strength properties. For example, as shown in FIG. 5, multiple portion ceramic fiber insert 26 may have a variable density portion 28 having the highest fiber density at the top surface of the portion 28 and with the lowest fiber density at the bottom surface. The orientation of the fibers typically would be such that they would run generally perpendicular to the axis of the preform or follow the contour of the upper surface, as shown in FIG. 5. A second portion 30 of insert 26 may or may not have a variable density with the orientation of the fibers typically running generally in the direction parallel to the preform. That is, the second portion of the preform has different characteristics (composition, orientation, density, etc.) from the other portion. In practice, this preform could be used to produce a piston 32, as shown in FIG. 6, with multiple ceramic fiber reinforcement portions as part of the piston. Further, a ceramic fiber insert member may also be used in the pin boss area.

The subject invention will now be described in greater detail with reference to the following example of the preferred practice of the invention. This example is set forth for the purposes of illustrating the invention and is not intended to limit the same.

PREFERRED PRACTICE OF THE INVENTION

1. A suitable preform of ceramic fibers of alumina fibers having 17% by volume fiber content in final composite at the functional top portion and gradually decreasing down to four percent by volume in the bottom portion is provided. This preform is then placed in a piston mold and an aluminum alloy at a temperature between 1250° F. and 1400° F. having a composition of by weight 4.0% Cu, 2.0% Ni, 1.5% Mg, and the balance of aluminum, is cast around it by the squeeze casting process as is known in the art, exerting a force of between five and 35 ksi.

2. The piston containing the preform is then cooled and removed from the mold.

3. The cooled piston is then solution heat-treated, quenched, and aged. The temperature of the heat treatment is at 960° F. plus or minus 10° F. for about four to 12 hours and then immediately quenched in water at 100° F. to 180° F. The piston is then aged at a temperature between 400° F. and 450° F. for three to five hours, yielding a piston having a tensile strength of 47 ksi. Of course, for other aluminum alloys the heating treatment parameters would be different.

4. The heat treated piston is then machined to the desired final dimensions, if required, in a conventional manner.

Pistons produced by the foregoing technique evidenced good wear resistance and resistance to thermal fatigue (thermally induced cracking), without the application of special surface coatings or other treatment, while possessing excellent strength properties and being reliable in operation and economical to produce. Typically, pistons which cannot be heat treated with quenching and aging will have tensile strengths of about 37 ksi as compared with those that have been heat treated with quenching and aging, which will have a tensile strength of 45 ksi or better. The heretofore problems of thermal cracking have been solved while still producing a high strength article. The use of the preform with single or multiple portions having preselected characteristics have made it possible to produce an article with high strength properties which overcomes the prior art problems of thermal cracking and low wear resistance without the necessity of special surface coatings, thus providing reliability in operation and economical fabrication.

While there have been described herein what are at present considered to be the preferred embodiments of this invention, it will be obvious to those skilled in the art that various changes and modifications may be made without departing from the invention, such as using zinc or other metal as the casting matrix material, and it is, therefore, aimed in the appended claims to cover all such changes and modifications as fall within the true spirit and scope of the invention.

What is claimed is:

1. A cast metal article comprising a body made from a metal taken from the group consisting of aluminum, magnesium, zinc and alloys thereof, said body having a first part of only said metal and a second composite part containing both said metal and a preform insert member of a ceramic fiber material, said preform insert member having a first preselected characteristic portion directly adjacent said first body portion oriented for achieving a highly reliable bond between the first part of the body and the second composite part, a second preselected characteristic portion apart from said first preselected characteristic portion oriented for providing optimum thermal fatigue and wear properties, thereby not necessitating the need for a special surface coating.

2. The article of claim 1 wherein said first preselected characteristic portion of composite part has a lower density of ceramic fibers than said second preselected characteristic portion.

3. The article of claim 2 wherein said density of fibers of said first preselected characteristic portion is generally from about 0 to about 5 volume percent and the density of fibers of said second preselected characteristic portion is generally from about 10 to about 50 volume percent.

4. The article of claim 1 wherein said first preselected characteristic portion directly adjacent said first body portion has a first orientation of ceramic fibers and the second preselected characteristic portion has a second different orientation of ceramic fibers.

5. The article of claim 1 wherein said first preselected characteristic portion has a lower density and different orientation of ceramic fibers from said second preselected characteristic portions.

6. The article of claim 1 wherein said preform insert member has a third preselected transitional characteristic portion between said first and second portion.

7. The article of claim 6 wherein said fibers in the third preselected transitional portion are of random orientation.

* * * * *

UNITED STATES PATENT AND TRADEMARK OFFICE
CERTIFICATE OF CORRECTION

PATENT NO. : 4,587,177
DATED : May 6, 1986
INVENTOR(S) : Milton W. Toaz and Martin D. Smalc It is certified that error appears in the above-identified patent and that said Letters Patent are hereby corrected as shown below:

On the title page,

Inventor's middle initial printed as "E." should be --W.--

(Milton W. Toaz, not Milton E. Toaz)

Signed and Sealed this

Twenty-fifth Day of November, 1986

*Attest:*

DONALD J. QUIGG

*Attesting Officer*     *Commissioner of Patents and Trademarks*